United States Patent [19]

Wilson et al.

[11]  4,246,210
[45]  Jan. 20, 1981

[54] LOW TEMPERATURE MATURATION OF SHEET MOLDING COMPOSITIONS

[75] Inventors: Edward L. Wilson, Newark; Walter D. Cottrell, Granville; Robert J. Gelin, Newark, all of Ohio

[73] Assignee: Owens-Corning Fiberglas Corporation, Toledo, Ohio

[21] Appl. No.: 931,043

[22] Filed: Aug. 4, 1978

[51] Int. Cl.$^3$ ................................................ B05B 3/00
[52] U.S. Cl. .................................. 264/28; 260/40 R; 264/237
[58] Field of Search ................. 264/139, 237, 28, 304, 264/236; 260/40 R

[56] References Cited

U.S. PATENT DOCUMENTS

| | | | |
|---|---|---|---|
| 2,187,146 | 1/1940 | Calcott et al. | 264/28 |
| 2,428,977 | 10/1947 | Maves | 264/28 |
| 2,804,653 | 9/1957 | Talalag | 264/28 |
| 3,083,410 | 4/1963 | McGlamers | 264/210 R |
| 3,153,685 | 10/1964 | O'Connor | 264/28 |
| 3,171,870 | 3/1965 | Moateil et al. | 264/28 |
| 3,242,246 | 3/1966 | Stand | 264/28 |
| 3,499,954 | 3/1970 | Trojan et al. | 264/213 |
| 3,701,748 | 10/1972 | Kovekel | 260/40 R |
| 3,963,844 | 6/1976 | Shimotsuma et al. | 428/36 |
| 3,975,353 | 8/1976 | Crowe et al. | 260/40 R |
| 3,988,388 | 10/1976 | Alberts et al. | 260/40 R |
| 4,038,342 | 7/1977 | Schwartz | 260/40 R |
| 4,042,646 | 8/1977 | Edamura et al. | 260/864 |
| 4,079,024 | 3/1978 | Hess et al. | 260/40 R |
| 4,085,246 | 4/1978 | Buser et al. | 260/40 R |
| 4,112,036 | 9/1978 | Woodhams et al. | 264/28 |

Primary Examiner—Jay H. Woo
Attorney, Agent, or Firm—Ronald C. Hudgens; Philip R. Cloutier; James B. Wilkens

[57] ABSTRACT

Composite sheets of low pressure molding compounds sandwiched between films of polyethylene are thickened to a viscosity at which the film can be stripped from the composite by the application of low temperatures to at least the surface of the sandwiched composite.

10 Claims, No Drawings

LOW TEMPERATURE MATURATION OF SHEET MOLDING COMPOSITIONS

NATURE OF THE INVENTION

This invention relates to thermosetting molding compounds. In a more specific aspect it relates to methods of thickening layers of thermosetting molding compounds for subsequent molding and curing.

BACKGROUND OF THE INVENTION

The production and use of sheet and bulk molding compounds are well known. Such molding compounds are based upon unsaturated polyester resin systems and are widely used in the production of automobile body parts. Usually such systems are based upon a combination of an unsaturated polyester resin contained in a monomer and a thermoplastic soluble in the monomer. These materials, in the form of a syrup, are blended with gelling agents, crosslinking catalysts, release agents and, optionally, colorants, inhibitors, and the like.

This blend of materials is produced in sheet form by laying down a first layer of the molding composition on a first layer of polyethylene film or the equivalent thereof, laying on this first layer of the molding composition a filler, for example, chopped glass fibers in an amount up to about 30 percent by weight of the total composition, and laying thereover a second layer of the molding composition. The two layers of molding composition with the filler sandwiched therebetween are then topped with a second sheet of polyethylene film and the composite is stored. During storage, the composite thickens to a viscosity at which the polyethylene film can be stripped from the composite with no substantial adherence of the molding composition to the film. At this viscosity, upon molding, the molding composition carries the filler with it to produce a substantially uniform distribution of the filler throughout the mold.

This thickening, or gelling process is vital to the production of the molding composition. The thickening must be slow enough to allow wet-out and impregnation of the glass reinforcement. However, the thickening must be fast enough to allow the handling required by molding operations as soon as possible in order to keep the amount of sheet in storage at a low inventory level. While the thickening must give a viscosity at molding temperatures low enough to permit sufficient flow to fill out the mold at reasonable pressure, the thickening must give a viscosity high enough to carry the glass filler or other reinforcement along as the composition flows in the mold. Ideally, however, and this is the aspect where prior art molding compositions have proved unsatisfactory, thickening should stop or the rate of thickening should substantially decrease in a viscosity range which permits molding at low perssures, that is, at pressures within the range of from about 30 to about 250 pounds per square inch in contrast to the 500 to 1500 pounds per square inch required by prior art molding compounds.

Prior art molding compounds are thickened often by the incorporation of thickening agents such as calcium hydroxide. The use of chemical thickening agents sometimes requires storage of the composite for several days before it can be used. The use of chemical thickeners also is plagued by the sensitivity of the chemical thickening reaction to temperature, moisture, and the particular chemical composition of the resin being cured. When chemical thickeners are used, control of the ultimate viscosity of the sheet molding composition is also limited.

An object of this invention accordingly is to provide a method of thickening sheets of molding composition composites which eliminates the use of chemical thickening agents. Another object of the invention is to provide a method of thickening wherein the degree of thickening can readily be controlled. These and other objects of the invention will be readily understood from the following disclosure of the invention.

SUMMARY OF THE INVENTION

Briefly stated this invention comprises subjecting a composite of sheet molding composition, filler, and supportive film, particularly the exposed surfaces thereof to reduced temperatures sufficient to thicken the molding composition to a viscosity at which the supportive film can be stripped away.

DESCRIPTION OF THE INVENTION

Ordinarily the moldable composition utilized in this invention will comprise an unsaturated, crosslinkable polyester, a monomer, and a thermoplastic soluble in the monomer.

They will have an initial viscosity when first compounded and prior to any significant period of gelling of less than about 100,000 centipoises and preferably a viscosity within the range of from about 20,000 to about 60,000 centipoises (Brookfield TA Spindle, 20 RPM at room temperature). The moldable composition will be comprised, preferably, of the following components:

a. an unsaturated, crosslinkable polyester resin in an amount within the range of from about 55 to about 80 parts by weight per 100 parts by weight of total resin. The polyester resin will be employed in the form of a monomer-containing syrup having a solids or resin content of approximately 67 percent by weight. The polyester resin will have an acid number, or value, within the range of from about 15 to about 45, and preferably about 35. It will have a molecular weight within the range of from about 1,500 to about 2,500;

b. a thermoplastic resin having an acid number up to about 3, the thermoplastic being present in the composition in an amount within the range of from about 20 to about 45 parts by weight per 100 parts by weight of total resin. The thermoplastic resin will be employed in the form of a monomer-containing syrup having a solids content of approximately 33 percent. The thermoplastic will have a preferred acid number of about 0.3. The thermoplastic will have a molecular weight within the range of from about 80,000 to about 350,000, preferably within the range of from about 100,000 to about 250,000 with a molecular weight of about 160,000 being preferred. (As used herein, "molecular weight" refers to weight average molecular weight);

c. a monomer in which the acid-functional thermoplastic is soluble;

d. a mold release agent, or internal lubricant, in an amount of from about 0.5 to about 4 parts by weight per 100 parts by weight of resin;

e. one or more fillers in an amount within the range of from about 25 to about 180 parts by weight per 100 parts by weight of resin;

f. chopped glass fibers in an amount within the range of from about 10 to about 35 parts by weight per 100 parts by weight of resin; and g. a crosslinking catalyst in an amount within the range of from about 0.1 to about 3 parts by weight per 100 parts by weight of resin.

In its preferred embodiment, the thermoplastic will have an acid number of about 0.3 and the gelling agent will be present in an amount of about 1 part by weight per 100 parts by weight of resin.

The unsaturated polyesters which can be employed in this invention are the poly condensation-products of at least one α,β-ethylenically unsaturated dicarboxylic acid (which term as used herein includes the corresponding anhydrides) and dihydric alcohols or oxides.

Suitable unsaturated dicarboxylic acids include maleic anhydride, fumaric acid, itaconic acid, citraconic acid and chloromaleic acid and the like, and mixtures thereof. Preferred materials are maleic anhydride and fumaric acid. A minor proportion of the unsaturated dicarboxylic acid, that is, up to about 25 mole percent, can be replaced by saturated carboxylic acids such as ortho-phthalic acid, succinic acid, adipic acid, sebacic acid, methyl-succinic acid and the like, and their mixture.

Suitable dihydric glycols and oxides which can be employed include 1,2-propanediol, dipropylene glycol, ethylene glycol, diethylene glycol, 1,3-butanediol, 1,4-butanediol, neopentyl glycol, triethylene glycol, tripropylene glycol, ethylene oxide and the like, and mixtures thereof.

The unsaturated polyester will be soluble in the after-defined monomers in which it will be crosslinkable during the molding process to a thermoset, continuous phase in which the thermoplastic will exist as the disperse phase.

The thermoplastic is a polymer or copolymer or mixture thereof which is prepared employing a free-radical initiator and at least one ethylenically unsaturated monomer. Suitable monomers include alkyl methacrylates and alkyl acrylates in which the alkyl group contains up to about 18 carbon atoms, including alkyl groups chosen from methyl, ethyl, n-propyl, isopropyl, n-butyl, isobutyl, 2-ethylhexyl, stearyl and the like, and mixtures thereof. Also suitable are cyclic methacrylates and acrylates wherein the cyclic group is chosen from cyclohexyl, benzyl, bicyclic groups such as isobornyl, bornyl, fenchyl, isofenchyl, and the like. Particularly suitable are monovinyl aromatic compounds such as styrene, substituted styrenes such as α-methyl styrene, vinyl toluene, tert-butylstyrene, halogen substituted styrenes such as chlorostyrene, dichlorostyrene and the like, and mixtures thereof. Also employable are acrylonitrile, methacrylonitrile, and mixtures of vinyl chloride and vinyl acetate. Cellulose acetate butyrate and cellulose acetate propioniate can also be used.

Preferred thermoplastics are formed from about 80 to about 99.9 weight percent styrene copolymerized with acrylic acid and, or, methacrylic acid in an amount within the range of from about 0.05 to about 1.9 weight percent; or with acrylonitrile in an amount within the range of from about 1.3 to about 20 weight percent; or with hydroxyethyl acrylate in an amount within the range of from about 1.3 to about 20 weight percent. Suitable thermoplastic compositions also include graft polymers of styrene and polybutadiene, styrene and styrene-butadiene polymers and the like containing from about 70 to about 97 weight percent styrene and from about 3 to about 30 weight percent of the elastomeric group.

As mentioned, the thermoplastic will have an acid number of up to about 3, the acid functionality being incorporated in the thermoplastic employing suitable carboxylic or other acid-functional substitutents such as acrylic acid, methacrylic acid and the like. The preferred thermoplastic comprises the reaction product of about 100 parts by weight of styrene and about 0.05 parts by weight acrylic acid, the acid functionality being incorporated in the thermoplastic as a component oleic the monomer system used to prepare the polymer.

The monomer will be one in which the thermoplastic is soluble and which is copolymerizable with the unsaturated polyester to produce a crosslinked, thermoset matrix. The monomer is a liquid monomer or mixture of monomers having at least one polymerizable reactive, ethylenically unsaturated (—C=C<) group per molecule. The monomer system can be chosen from the group consisting of styrene, substituted styrenes such as vinyl toluene, tert-butyl styrene, lower (i.e. $C_2$ to $C_4$) alkyl esters of acrylic and methacrylic acids, α-methyl styrene, cyclic acrylates, methacrylates such as cyclohexyl methacrylate and acrylate, benzyl methacrylate and acrylate and the like, bicyclic methacrylates and acrylates such as isobornyl methacrylate and acrylate, halogenated styrenes such as chlorostyrene, dichlorostyrene, 1,3-butanediol dimethacrylate, diallyl phthalate and the like, and mixtures thereof.

The mold release agents which can be used in this invention are those well known in the art and include stearates of zinc, calcium, aluminum and the like.

Various types and concentrations of fillers can be employed in the present invention, these including clay, talc, mica, calcium carbonate, silicas, carbon black, glass fibers and the like. In the composition of the present invention, calcium carbonate and chopped glass fibers are employed in the preferred embodiment.

The crosslinking catalysts will be such as are conventionally employed. These comprise free radical catalysts which do not degrade until molding temperatures are attained but which provide fast cure after gellation. Among the catalysts which can be employed are benzoyl peroxide, tert-butyl perbenzoate, tert-butyl peroxide, tert-butyl peroctoate, lauroyl peroxide, and the like.

This blend of materials is produced in sheet form by laying down a first layer of the moving composition on a first layer of polyethylene film or the equivalent thereof. Next on this first layer of molding composition chopped glass fibers or similar reinforcing material is placed in an amount up to about 30% by weight of the total composition. Subsequently, a second layer of the molding composition is applied over the chopped reinforcing material. A second layer of polyethylene film or the equivalent is then placed on top of the material. The composite is then subjected to low temperatures for a period of time sufficient to at least gel the surface area of the composite. The polyethylene film is then stripped away from both sides of the composite leaving the gelled sheet material. The gelled material is then placed in a mold of desired configuration and subjected to typical low pressure molding operations.

The temperature at which the molding composition is chilled and the duration of the chilling operation can be readily determined by those skilled in the art. Typically temperatures of between $-10$ and $-80$ degrees C. will be utilized. The method of chilling can be varied. The sheets of molding composition can be inserted into a refrigerated area for the desired length of time. Flash freezing techniques may also be utilized. Preferably, the sheets are chilled by the direct application of solidified carbon dioxide (dry ice) for a period of time.

EXAMPLE

A molding composition sheet approximately three inches thick and having a density of ten ounces per square foot was placed in contact with dry ice for a period of forty-five seconds, twenty minutes after the composition was formulated. Polyethylene films had been used as the supported films. Subsequent to the chilling operation the polyethylene films were removed and the material was subjected to molding operations successfully. No change in the subsequent molding operation was necessary because of the lower temperature of the molding composition. The resultant molded product had all of the desirable properties ordinarily associated with similar molded products.

The method of this invention although simple in concept provides many unexpected advantages. By controlling the temperature any desired viscosity of molding composition can be obtained without changing the chemical formulation of the molding composition. The necessity of maintaining a large storage area for curing of the composition is obviated. It is also possible to use curing initiators which formerly because of a short shelf life were not usable. These compounds are now, however, usable because of the lower temperatures available. The time required for processing and molding is substantially reduced through use of this invention.

It will be evident from the foregoing that various modifications can be made to this invention. Such, however, are considered as being within the scope of the invention.

What is claimed is:

1. A method for thickening a sheet molding composition comprising an unsaturated polyester, a monomer and a thermoplastic to a condition wherein it is handleable, said method comprising subjecting said sheet molding composition to a temperature substantially less than ambient temperature.

2. The method of claim 1 wherein said temperature is between about $-10$ and about $-80$ degrees C.

3. The method of claim 1 wherein said sheet comprises a first layer of a polyethylene film, a superimposed layer of a thermosetting resin composition, a superimposed layer of a reinforcing material, a second layer of thermosetting resin, and a second polyethylene film.

4. The method of claim 1 wherein said reinforcing material is chopped glass fibers.

5. The method of claim 1 wherein said low temperature is reached by the application of solidified carbon dioxide.

6. The method of claim 1 wherein said sheet molding composition is substantially free of chemical thickening agents.

7. The method of claim 2 wherein said sheet molding composition is substantially free of chemical thickening agents.

8. The method of claim 3 wherein said sheet molding composition is substantially free of chemical thickening agents.

9. The method of claim 4 wherein said sheet molding composition is substantially free of chemical thickening agents.

10. The method of claim 5 wherein said sheet molding composition is substantially free of chemical thickening agents.

* * * * *